US008834172B2

(12) United States Patent
Rubinstein et al.

(10) Patent No.: US 8,834,172 B2
(45) Date of Patent: Sep. 16, 2014

(54) PHYSICAL HEART SIMULATOR

(75) Inventors: Vladimir Rubinstein, Haifa (IL); Meir Bar-Tal, Haifa (IL); Michael Levin, Haifa (IL)

(73) Assignee: Biosense Webster (Israel) Ltd., Yokneam (IL)

( * ) Notice: Subject to any disclaimer, the term of this patent is extended or adjusted under 35 U.S.C. 154(b) by 49 days.

(21) Appl. No.: 13/494,334

(22) Filed: Jun. 12, 2012

(65) Prior Publication Data
US 2013/0330701 A1 Dec. 12, 2013

(51) Int. Cl.
*G09B 23/28* (2006.01)

(52) U.S. Cl.
USPC .......................................... 434/267; 434/262

(58) Field of Classification Search
USPC ............................ 434/262–275; 600/508, 515
See application file for complete search history.

(56) References Cited

U.S. PATENT DOCUMENTS

| 5,482,472 | A * | 1/1996 | Garoni et al. .................. 434/272 |
| 6,234,804 | B1 * | 5/2001 | Yong .............................. 434/267 |
| 6,910,896 | B1 | 6/2005 | Owens et al. |
| 7,798,815 | B2 * | 9/2010 | Ramphal et al. .............. 434/265 |
| 2004/0033477 | A1 | 2/2004 | Ramphal et al. |
| 2005/0181342 | A1 | 8/2005 | Toly |
| 2008/0138780 | A1 | 6/2008 | Eggert et al. |
| 2008/0293025 | A1 * | 11/2008 | Zamierowsi et al. .......... 434/262 |
| 2010/0279263 | A1 | 11/2010 | Duryea |
| 2013/0203032 | A1 * | 8/2013 | Bardsley et al. .............. 434/268 |

FOREIGN PATENT DOCUMENTS

| EP | 2047797 A2 | 4/2009 |
| EP | 2439719 A1 | 4/2012 |
| WO | WO 2005/051166 A2 | 6/2005 |

OTHER PUBLICATIONS

European Search Report, Application No. 13171368.7-1958, dated Oct. 30, 2013.

* cited by examiner

*Primary Examiner* — Timothy A Musselman
(74) *Attorney, Agent, or Firm* — Wayne C. Jaeschke, Jr.

(57) ABSTRACT

Apparatus, including a mockup cavity, simulating an actual body cavity of a human subject, wherein walls defining the mockup cavity comprise a tissue equivalent material (TEM). An array of electrodes are embedded in the walls. The apparatus further includes a programmable signal generator, connected to the electrodes, and configured to apply varying potentials to the array of electrodes so as to simulate electrophysiological potentials occurring in the actual body cavity on surfaces of the walls.

26 Claims, 3 Drawing Sheets

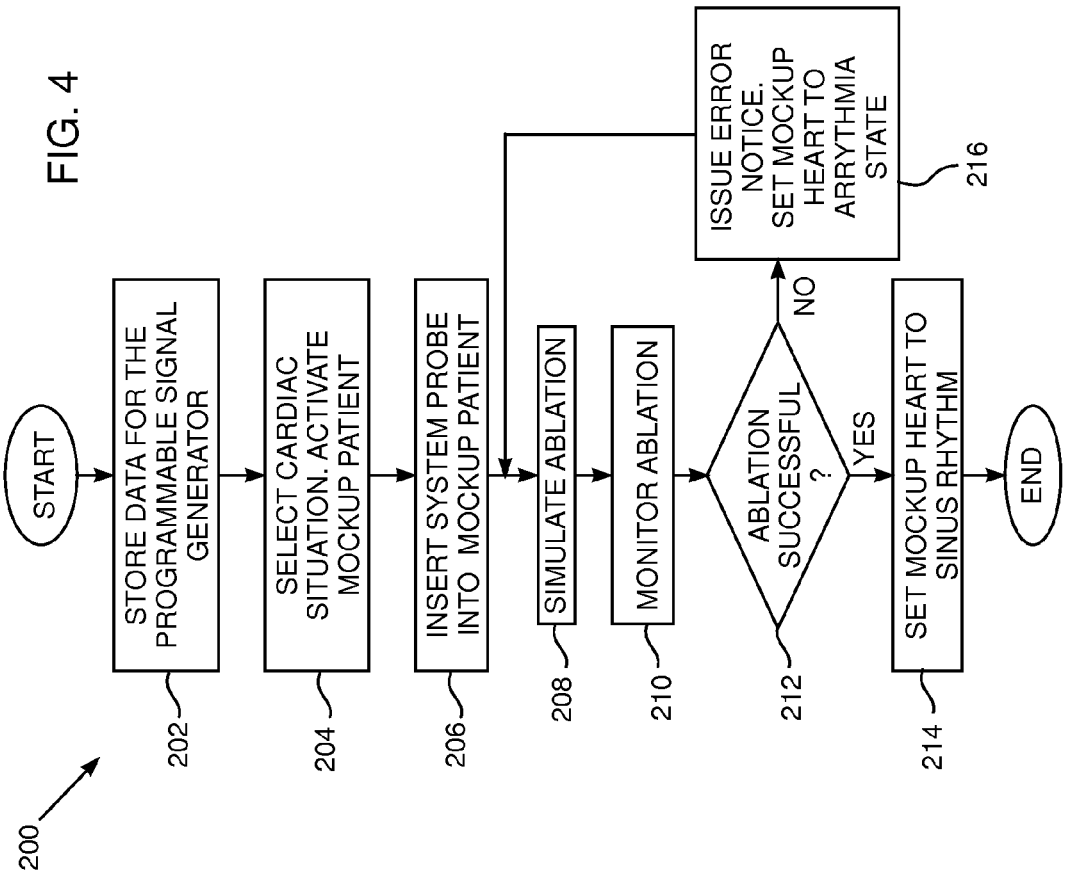
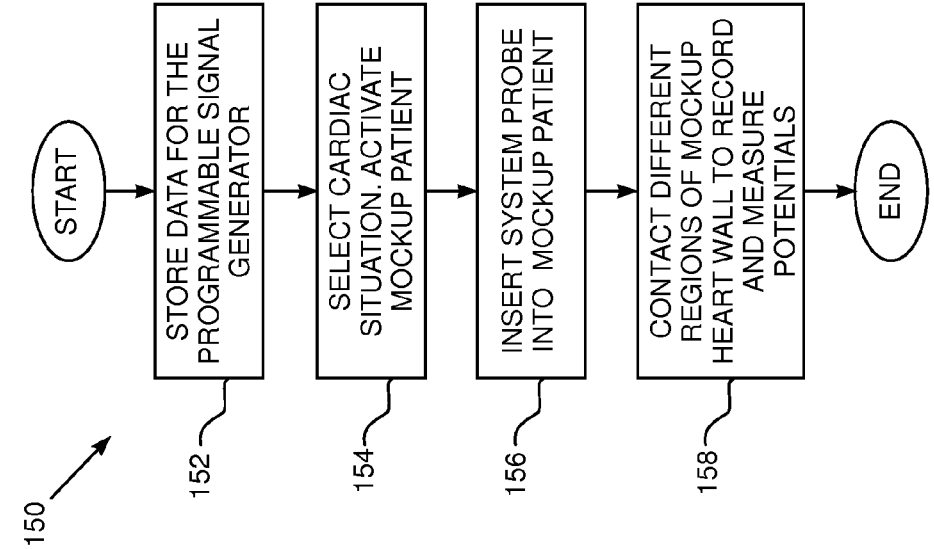

PHYSICAL HEART SIMULATOR

FIELD OF THE INVENTION

The present invention relates generally to invasive medical procedures, and specifically to simulation of an invasive electrophysiological procedure.

BACKGROUND OF THE INVENTION

There is typically a learning curve associated with any medical procedure, and depending on the procedure, the learning curve may in some cases be relatively "steep." Even where learning curves are not steep, there is typically a not inconsiderable time period involved in learning and perfecting the procedure. Having the ability to simulate the procedure may reduce the time period.

SUMMARY OF THE INVENTION

An embodiment of the present invention provides apparatus, including:

a mockup cavity, simulating an actual body cavity of a human subject, wherein walls defining the mockup cavity include a tissue equivalent material (TEM);

an array of electrodes embedded in the walls; and a programmable signal generator, connected to the electrodes, and configured to apply varying potentials to the array of electrodes so as to simulate electrophysiological potentials occurring in the actual body cavity on surfaces of the walls.

Typically, the mockup cavity is included in a mockup human heart, and the simulated electrophysiological potentials may replicate sinus potentials occurring in a human heart.

Alternatively, the simulated electrophysiological potentials may replicate arrhythmic potentials occurring in a human heart.

In a disclosed embodiment thee apparatus includes a heart beat generator configured to cause the mockup human heart to beat.

In a further disclosed embodiment the apparatus includes a system probe configured to be inserted into the mockup human heart and to measure a characteristic of human heart activity. The system probe may include a probe electrode, configured to sense the electrophysiological potentials simulated on the surfaces of the walls. The system probe may include a force sensor configured to sense a force applied by a surface of the mockup human heart on the sensor. The system probe may include a sensor configured to sense a temperature of a surface of the mockup human heart.

In an alternative embodiment the mockup human heart is located within a mockup human patient. The mockup human patient may include surface electrodes configured to sense surface potentials in response to the simulated electrophysiological potentials. Typically, the surface potentials simulate electrocardiograph (ECG) signals on skin of a human patient. The alternative embodiment may include a respiration generator configured to simulate respiration in the mockup human patient.

There is further provided, according to an embodiment of the present invention, a method, including:

simulating an actual body cavity of a human subject with a mockup cavity, wherein walls defining the mockup cavity include a tissue equivalent material (TEM);

embedding an array of electrodes in the walls;

connecting a programmable signal generator to the electrodes; and configuring the programmable signal generator to apply varying potentials to the array of electrodes so as to simulate electrophysiological potentials occurring in the actual body cavity on surfaces of the walls.

The present invention will be more fully understood from the following detailed description of the embodiments thereof, taken together with the drawings in which:

BRIEF DESCRIPTION OF THE DRAWINGS

FIG. 3 is a flowchart of steps performed during simulation of an invasive medical procedure, according to an embodiment of the present invention; and FIG. 4 is a flowchart of steps performed during simulation of an invasive medical procedure, according to an alternative embodiment of the present invention.

DETAILED DESCRIPTION OF EMBODIMENTS

Overview

Embodiments of the present invention provide apparatus and a method that allow an operator, typically a medical professional, to simulate an invasive medical procedure performed on a body cavity of a human subject, using a mockup cavity. The mockup cavity has walls formed from tissue equivalent material (TEM) and is typically a part of a mockup of a human heart or other internal organ, on which the simulated procedure is to be performed.

An array of electrodes is embedded in the walls of the mockup cavity, and a programmable signal generator is connected to the electrodes. The generator is configured to apply varying potentials to the electrodes, so as to simulate electrophysiological (EP) potentials occurring in the actual body cavity on surfaces of the walls.

In the case of a mockup heart, the EP potentials may be configured to replicate a normal sinus condition (sinus spatio-temporal pattern) of a beating heart. Alternatively, the EP potentials may be configured to replicate potentials from one of a number of arrhythmic spatio-temporal patterns. Typically, data used by the generator in generating the varying potentials is stored in a memory of the apparatus, and is provided to the generator once the operator has selected a situation, such as a normal sinus condition, to be simulated.

The mockup cavity is typically installed in a mockup patient, and the operator inserts an EP system probe, comprising at its distal end elements such as a sensing electrode and a position sensor, through the mockup patient into the mockup cavity. When the sensing electrode contacts the walls of the cavity, it detects the potentials being generated on the walls, and provides the potentials and position signals to a processing unit of the apparatus. The processing unit may typically be comprised in a catheter tracking system, such as a CARTO system provided by Biosense Webster Inc. of Diamond Bar, Calif. Typically, the operator moves the sensing electrode to contact a number of different positions on the walls, recording the potentials at each position. The processing unit may use the recorded potentials to prepare a simulated electrophysiological map of the cavity.

In some embodiments, typically those comprising a mockup heart in a mockup patient, a heartbeat generator and/or a respiration generator may be configured to cause the mockup heart to beat, and/or the mockup patient to respire.

DETAILED DESCRIPTION

Figure 1:
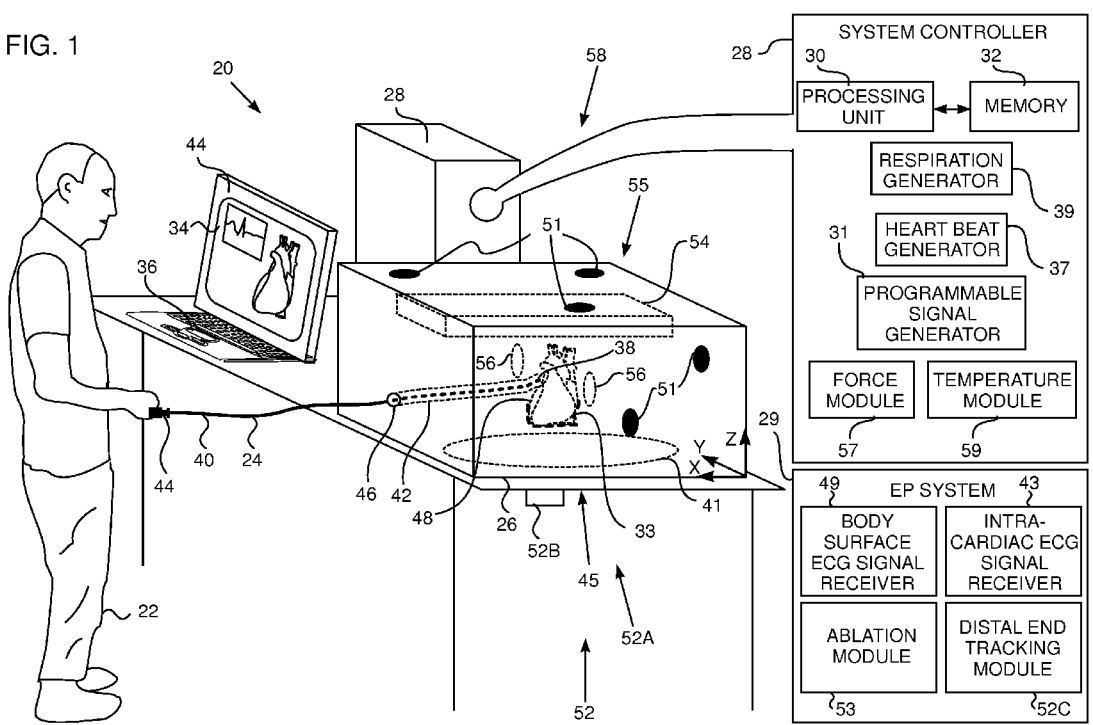
FIG. 1 is a schematic diagram illustrating a simulation system, according to an embodiment of the present invention.

Reference is now made to FIG. 1, which is a schematic diagram illustrating a simulation system 20, according to an embodiment of the present invention. System 20 allows a human operator 22 of the system, typically a medical professional such as a physician, to perform a simulation of an invasive medical procedure. In the actual medical procedure, the operator inserts a catheter probe into a cavity of a patient, typically the cavity of an organ such as the heart, and directs a distal end of the probe by manipulating controls at the proximal end of the probe.

In simulation system 20 an electrophysiological (EP) system probe 24 is inserted into a mockup patient 26, which replaces the actual patient of an actual procedure. EP system probe 24 may be substantially similar in construction and operation to a probe used in an actual procedure, herein termed a procedure-probe. However, unlike a procedure-probe, EP system probe 24 is not required to meet the same stringent safety standards as a procedure-probe, and is typically reusable. Thus EP system probe 24 typically comprises at least some of the same functional elements as a procedure-probe, such as functional distal end tracking elements and functional potential-measuring electrodes at the distal end.

In an alternative embodiment EP system probe 24 may be configured to have other functional elements that may be present in a procedure-probe, such as a functional force sensor 55 and a functional temperature sensor 58. In a further alternative embodiment, system 20 may be configured to simulate the effect of elements present in a procedure-probe. Such elements may include, but are not limited to, an ablation electrode, i.e., an electrode configured to deliver radiofrequency energy. The simulation required for these elements is typically implemented using respective software components, described in more detail below.

Herein, by way of example, mockup patient 26 is assumed to have a box-like shape. However, the mockup patient may have any convenient shape, including a shape that is more human-like. System 20 is typically used to teach aspects of the functioning of procedure-probes, prior to operator 22 having to perform an actual procedure. Alternatively or additionally, system 20 may be used by the operator to review results of an actual procedure, as well as for research and development purposes.

In the embodiments described hereinbelow, it is assumed that system probe 24 is used in simulating insertion of a procedure-probe into one or more cavities in the heart of a real patient. In an actual procedure the signals are sensed by the procedure-probe. System 20 simulates signals that occur on the walls of the real cavities due to electrophysiological action of the real heart, and these simulated signals are sensed by the system probe. Alternatively, system 20 may be used, mutatis mutandis, for simulating other therapeutic and/or diagnostic procedures in the heart or in other body organs.

During an actual procedure, operator 22 typically uses more than one procedure-probe, each of the different procedure-probes having different features such as characteristic shapes or differing numbers or types of electrodes. In the simulations described herein, the operator may also use more than one system probe 24. For clarity, as necessary and where more than one system probe is being used, the different system probes may be differentiated by having a letter appended to the identifier 24, so that in a simulation of a procedure using two procedure-probes, the operator may use system probe 24A and system probe 24B.

In some embodiments, the simulation of a procedure involving more than one procedure-probe is implemented by using one system probe 24, i.e., a physical system probe, and one or more simulated or virtual probes. Unlike physical system probes, simulated probes have no physical component that is inserted into mockup patient 26. Examples using either two physical system probes 24A, 24B, or one physical system probe 24 and a simulated probe, are described below.

The functioning of system 20 is managed by a system controller 28, comprising a processing unit 30 communicating with a memory 32, wherein is stored software for operation of system 20. Controller 28 is typically an industry-standard personal computer comprising a general-purpose computer processor. However, in some embodiments, at least some of the functions of the controller, and modules comprised in the controller (described below), may be performed using custom-designed hardware and software, such as an application specific integrated circuit (ASIC) and/or a field programmable gate array (FPGA). Communication between system controller 28 and elements of system 20, comprising signals between the controller and the elements, may be by a physical cable such as a conductive or optical cable, and/or by wireless. For clarity, physical elements of system 20 concerned with the communication are not shown in FIG. 1.

The software in memory 32 may be downloaded to the controller in electronic form, over a network, for example. Alternatively or additionally, the software may be provided on non-transitory tangible media, such as optical, magnetic, or electronic storage media.

Controller 28 comprises a number of modules operating system 20. Each module may be implemented in hardware, software stored in memory 32, or a combination of hardware and software, as described above. The modules in controller 28 are:

- A programmable signal generator 31, which provides signals to an array of electrodes 33 in a mockup heart 48. Signal generator 31, electrodes 33 and mockup heart 48, together with other elements related to system 20, are described in more detail with respect to FIG. 2 below.
- A heart beat generator 37, which generates signals, or provides physical output via a mechanical coupling (such as a hydraulic or mechanical connection), for a mechanical vibrator 56 in the mockup patient, causing mockup heart 48 to beat.
- A respiration generator 39, which generates signals, or provides physical output via a mechanical coupling, causing mockup lungs 41 in the mockup patient to respire.
- A force module 57, which couples to force sensor 55, to determine values of force measured by the sensor.
- A temperature module 59, which processing unit 30 uses to estimate temperatures during a simulation. The estimated temperatures correspond to those that would be sensed by a temperature sensor in a procedure-probe.

System 20 also comprises an electrophysiological (EP) control system 29, which acts to receive signals from system probe 24 and mockup patient 26, as well as to provide other functions that may be implemented in system 20. EP system 29 may be implemented and operated by a CARTO system, provided by Biosense Webster Inc. of Diamond Bar, Calif., modified if necessary. Alternatively, EP control system 29 may be operated by system controller 28. For simplicity, in the description herein EP control system 29 is assumed to be operated by system controller 28.

EP control system 29 comprises a number of modules which may be implemented in hardware, software, or a combination of hardware and software. The modules in system 29 are:

- An intra-cardiac electrocardiograph (ECG) signal receiver 43, which receives signals from one or more electrodes 45 located at a distal end 38 of system probe 24.
- A body surface ECG signal receiver 49, which receives signals from one or more "skin" electrodes 51 on a surface of mockup patient 26. As described in more detail below, the signals on electrodes 51 are derived from currents, transmitting through a mockup torso 54 of mockup patient 26, generated in response to potentials on electrodes 33. Mockup torso 54 is constructed from TEM, and is implemented to have similar electrical properties to those of an actual human torso.
- An ablation module 53, which allows operator 22 to input simulated parameters related to a simulated ablation into system 20, and which generates simulated outputs of the simulated ablation. Simulated input parameters which may be set by the operator comprise, for example, a radiofrequency power level and a time of application of the radiofrequency power. Simulated outputs which may be generated by the module comprise, for example, a temperature of tissue that has undergone the simulated ablation. Other functionality of ablation module 53 is described below, with reference to FIG. 4.
- A distal end tracking module 52C, which in conjunction with other elements of system 20 described below, allows operator 22 to track the location and orientation of distal end 38.

System controller 28 operates a graphic user interface (GUI) 34, which presents results generated by the system to operator 22 on a display 44. GUI 34 also enables the operator to choose various options in setting up a simulation. Typically, the operator interacts with controller 28 and GUI 34 using a pointing device 36, such as a touchpad or a mouse.

Within mockup patient 26 operator 22 is able to maneuver distal end 38 of system probe 24 by holding and manipulating a proximal end 40 of the system probe. Typically, a resilient tube 42, supported by a material such as fiberglass or polystyrene pellets, is placed within mockup patient 26 to simulate a vein or artery of an actual patient. Tube 42 acts as a support and a guide for the system probe, while not unduly impeding forward or backward motion of the probe. Typically, the operator uses a handle 44 to hold the system probe, as she/he would typically hold a procedure-probe during an actual medical procedure. The operator manipulation typically also includes other motions such as transverse and rotational movements of the proximal end to generate corresponding maneuvers of the distal end.

The manipulation of the proximal end includes insertion, via an aperture 46 in the mockup patient which connects to tube 42, of the system probe into mockup heart 48 situated in the distal region of the mockup patient. (The manipulation also includes removal of the system probe via the same aperture.)

In order to implement its simulation, system controller 28 tracks the position of distal end 38, using tracking signals from an object tracking system 52. The tracking is performed at least within mockup heart 48, and may typically also be partly outside the heart. During an actual procedure the distal end of a procedure-probe is tracked, for example by a magnetic tracking system such as is implemented in the CARTO system referred to above. While embodiments of the present invention may use such a tracking system, mutatis mutandis, it is not necessary that distal end 38 is tracked by a system that is normally used in an invasive procedure. Other systems for tracking distal end 38, such as an ultrasonic system, will be familiar to those of ordinary skill in the art, and all such systems and their associated tracking devices are assumed to be comprised within the scope of the present invention.

Herein, by way of example, the position of distal end 38 is assumed to be tracked with respect to a set of xyz orthogonal axes defined by edges of mockup patient 26. Also by way of example, tracking system 52 is assumed to include coils 52A mounted in distal end 38, magnetic transmitters 52B interacting with the coils, and distal end tracking module 52C which operates the transmitters and receives signals from the coils in order to determine the location and orientation of the distal end.

Figure 2:
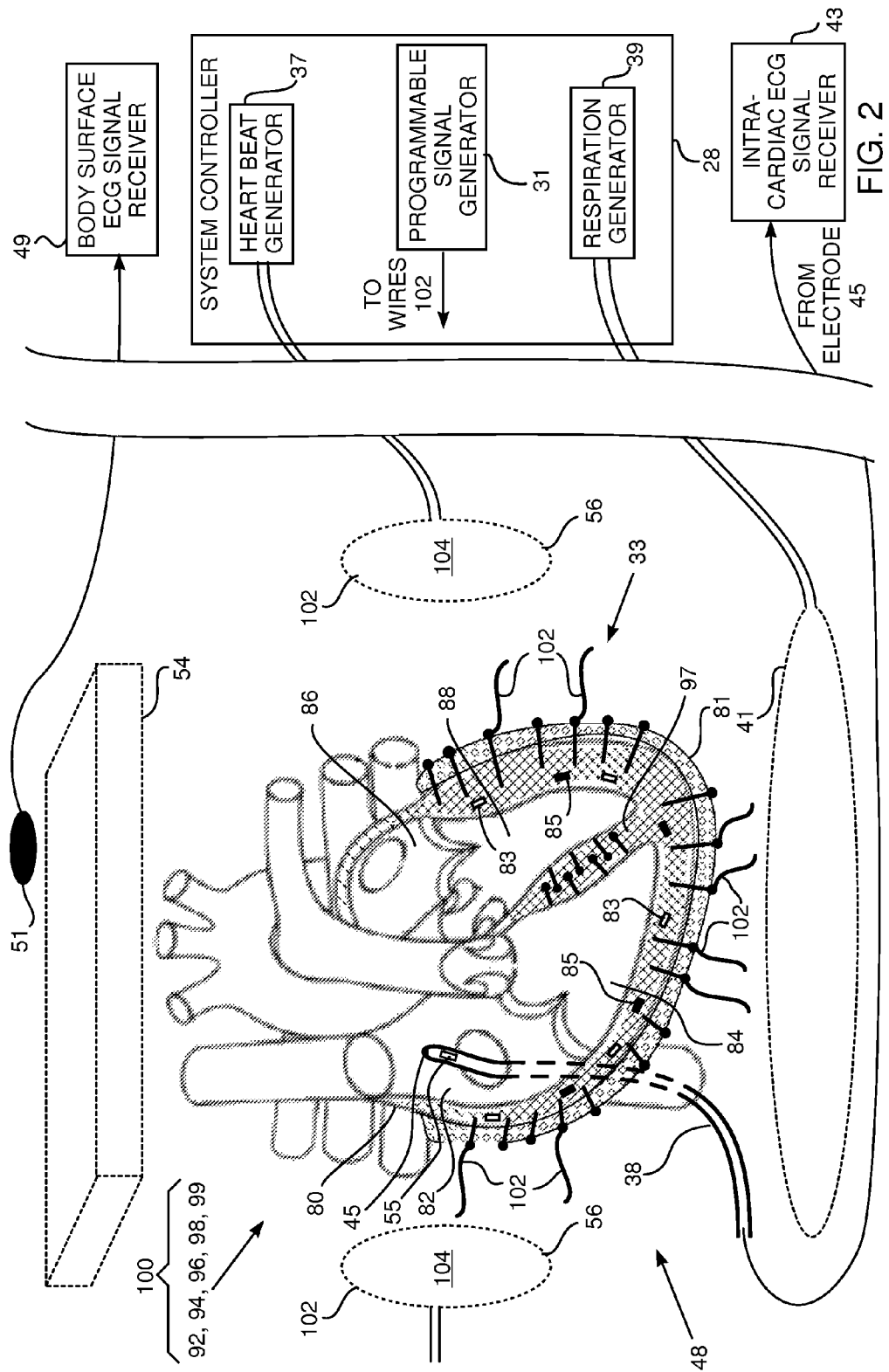
FIG. 2 is a schematic cross-sectional drawing of a mockup heart, and elements coupled to the mockup heart, according to an embodiment of the present invention.

FIG. 2 is a schematic cross-sectional drawing of mockup heart 48, and elements coupled to the mockup heart, according to an embodiment of the present invention. Mockup heart 48 typically comprises a full-size flexible model of a generic heart, constructed from heart tissue equivalent materials (TEMs) 80. Thus, the model constructed from TEMs 80 comprises, for example, a mockup right atrium 82, a mockup right ventricle 84, a mockup left atrium 86, and a mockup left ventricle 88, and these mockup cavities have respective surfaces 92, 94, 96, and 98. For clarity, only portions of TEMs 80 comprising parts of the walls of the mockup right atrium, the mockup right ventricle, the mockup left atrium, the mockup left ventricle, and a mockup septum 97 with surfaces 99, are shaded in FIG. 2. TEMs 80 are supported, as required, by an electrical insulator 81.

Materials 80 are selected to have generally similar electrical conductivities and thermal properties as an endocardium, although, as described below, the electrical functionality of materials 80 is modified. The modifications are implemented so that signals transmitted from programmable signal generator 31 form potentials on surfaces of the mockup heart that correspond to the electrophysiological (EP) potentials appearing on the corresponding surfaces of an actual heart. For simplicity, in the description herein the surfaces on which the EP potentials are formed are termed surfaces 100, and comprise, but are not limited to, surfaces 92, 94, 96, 98, and 99. Those with ordinary skill in the art will be able to adapt the description for surfaces 100 other than surfaces 92, 94, 96, 98, and 99.

In order to simulate the electrophysiological potentials of an actual heart, sections of TEMs 80 have arrays of electrodes 33 embedded in the material. Typically, the electrodes are embedded so that they do not protrude from surfaces 100, ending below the surfaces. In some embodiments, however, the electrodes may end flush with the surface, and in some embodiments the electrodes may protrude slightly from the surface. Electrodes 33 penetrate through, and are held in place, by insulator 81, which insulates the electrodes from each other.

In some embodiments one or more force sensors 83 and/or one or more temperature sensors 85 are embedded in TEMs 80. Controller 28 may use the sensors to provide measures of the force and temperature of the regions where the sensors are embedded. Such measurements may be used by the controller for comparison with measures of force and temperature provided by force sensor 55 and temperature sensor 58 in distal end 38.

Electrodes 33 receive signals corresponding to the potentials to be generated on the mockup cavity surfaces from programmable signal generator 31, via respective wires 102 connecting the generator to each electrode. For clarity, in FIG. 2 each electrode 33 is shown as a line having a solid circle at one end, the solid circle corresponding to the point at which a specific wire 102 connects to a specific electrode 33.

Typically, at least some of the mockup cavities of mockup heart 48 are at least partially filled with a conductive liquid, such as normal saline solution. The conductive liquid facilitates the simulation of EP potentials on surfaces 100. In order to simulate the EP potentials as accurately as possible, an initial calibration process may be performed, varying the signals generated by generator 31, and measuring the potentials produced on surfaces 100 until required EP potentials are achieved.

In some embodiments heart beat generator 37 is implemented to cause mockup heart 48 to beat. By way of example, generator 37 reversibly transfers a fluid 104, liquid or gas, to resilient balloons 102, and the generator uses the fluid to inflate or deflate the balloons. The inflation and deflation of the balloons compresses the mockup heart or allows it to expand. Balloons 102 together with fluid 104 act as mechanical vibrators 56 of the mockup heart. Alternatively, the generator may reversibly transfer fluid 104 to one or more cavities of mockup heart 48, causing the mockup heart to beat. In this case, the cavities and fluid 104 comprise the mechanical vibrators. In some embodiments, fluid 104 comprises the conductive liquid facilitating simulation of the EP potentials, referred to above. Further alternatively, generator 37 may cause the mockup heart to beat using electromechanical, hydraulic, or other suitable activation systems, which will be apparent to those having skill in the art, for generating a repetitive, beating, motion.

In some embodiments respiration generator 39 is implemented to activate mockup lungs 41 to respire, and so move mockup heart 48 in a cyclic respiration path. Mockup lungs 41 may be implemented as resilient balloons generally similar to balloons 102, and may be deflated and inflated, using a fluid, as described above for the balloons. Alternatively, generator 39 may be implemented to cause the mockup lungs to respire using systems, referred to above, for generating a repetitive motion.

During a simulation, and once operator 22 has inserted distal end 38 into mockup heart 48, electrode 45 senses potentials on surfaces 100, and transfers the sensed potentials to catheter signal receiver 43. Receiver 43, together with PU 30, processes the surface potentials, and may present results of the processing on display 44. The results are typically presented pictorially and/or in a text format. For example, a graph of the sensed potential vs. time may be shown on display 44.

Also during a simulation, electrodes 51 (only one of which, for clarity, is shown in FIG. 2) sense "skin" potentials generated in response to the EP potentials generated on surfaces 100. The skin potentials transfer to ECG receiver 49, and after processing may be presented on display 44, typically in a similar format to the potentials from surfaces 100.

FIG. 3 is a flowchart 150 of steps performed during simulation of an invasive medical procedure, according to an embodiment of the present invention. The procedure that is being simulated is assumed to be preparing an electrophysiological map of a heart. In a preprogramming step 152, sets of data, corresponding to potentials to be applied to electrodes 33, are stored in memory 32. Typically, the sets of data are generated in the calibration process referred to above.

Typically, each set of stored data corresponds to electrophysiological potentials of a known cardiac situation. For each situation, a set of correspondences of potentials vs. times is stored for each electrode 33, typically for a time period for at least one complete heart beat. Thus, a "sinus set" of data corresponds to the potentials and times of application of the potentials on electrodes 33 that apply during a sinus rhythm of the heart. An "atrioventricular nodal reentrant tachycardia (AVNRT) set" of data corresponds to the potentials on electrodes 33 that apply during an AVNRT arrhythmia of the heart. Other arrhythmias for which potentials vs times may be stored include, but are not limited to Atrial Tachycardia, Atrial Fibrillation, Atrial Flatter, Ventrical Tachycardia, Ventrical Flatter, Ventrical Fibrillation, Atrioventricular reentrant tachycardia (AVRT), and Wolff-Parkinson-White (WPW) Syndrome.

In addition, one or more sets of data, corresponding to potentials that have been previously recorded for a specific patient, may be stored in memory 32.

In a simulation setup step 154 operator 22 selects a cardiac situation to be simulated by system 20. In addition, the operator typically selects a heart beat rate and a respiration rate that are to be applied during the simulation. The selections are typically performed by display 44 presenting to the operator possible cardiac situations, corresponding to the sets of data stored in step 152. The operator may use pointing device 36 to select the situation to be simulated, as well as the heart beat and respiration rates.

Processor 30 provides data from the selected situation to programmable signal generator 31, which uses the data, together with the selected heart beat rate, to generate periodically changing potentials for the sets of electrodes 33. In addition, processor 30 activates heart beat generator 37 and respiration generator 39, causing mechanical vibrators 56 to initiate mockup heart 48 beating, and mockup lungs 41 to respire.

In some embodiments, to simulate the fact that the EP potentials on a real heart do not exactly repeat, and that the heart beat and the respiration of a real patient are also typically not exactly repeatable, processor 30 may add one or more noise factors to the EP potentials, the heart rate, and/or the respiration. The added noise factor for the EP potentials causes the value of each potential on an electrode 33 to vary, within a preset range, from one cycle to another. The processor may apply similar noise factors to alter, within respective preset ranges, the amplitudes and frequencies of the heart beat and of the respiration.

The potentials generated on electrodes 33 form ECG potentials on skin electrodes 51. Receiver 49 processes the ECG potentials from electrodes 51 and presents the results to operator 22, typically as a graph on display 44, showing the operator that mockup patient 26 is "alive."

In an insert probe step 156 the operator inserts EP system probe 24 through aperture 46 into mockup patient 26. During the time that the system probe is within the mockup patient, catheter signal receiver 43 processes the potentials sensed on electrode 45, and presents the processed results, typically numerically and/or graphically, on display 44. In addition, tracking device tracks the distal end of the system probe, and presents the position of the distal end on the display.

In an investigation step 158, the operator continues to insert the system probe until it contacts a region of surfaces 100 of the heart wall. The operator may verify the contact from the position of the distal end, as well as from the EP potential measured by electrode 45, both of which are presented on display 44. Once a particular region of surfaces 100 has been contacted, the processor, under direction from the operator, samples the EP potential vs. time values generated by the region. The processor records the sampled values of the EP potentials.

The operator moves the distal end of the probe to contact a different region of surfaces 100, and the processor samples and records the EP potentials for that region. The operator continues the process of moving the distal end to different regions of surfaces 100, and recording the EP potentials of the regions, until a sufficient number of different regions have been measured for the processor to be able to generate an electrophysiological map of the mockup heart, at which point the simulation ends.

Flowchart 150 describes steps for system 20 to simulate preparation of an electrophysiological map of a heart. System 20 may be used for simulating other invasive procedures, and the simulation of one such procedure is described below, with reference to FIG. 4.

FIG. 4 is a flowchart 200 of steps performed during simulation of an invasive medical procedure, according to an alternative embodiment of the present invention. In this case, the procedure being simulated is assumed to comprise an ablation of heart tissue, to correct a heart with AVNRT. The procedure-probe used for such an actual procedure typically comprises a force sensor, a temperature sensor, and one or more electrodes with which radiofrequency energy may be applied to endocardium tissue in order to ablate the tissue. For the simulation described herein, ablation is simulated, rather than being actually performed on TEMs 80. Those having ordinary skill in the art will be able to adapt the description, mutatis mutandis, for cases wherein TEMs 80 are actually ablated.

In the simulation described herein, system probe 24 is assumed to comprise force sensor 55 and may comprise temperature sensor 58. In addition, system 20, using processing unit 30 and ablation module 53, is assumed to simulate the presence of a temperature sensor in the system probe with temperature module 59, and also to simulate the effects of ablation with ablation module 53. (In the case of an actual ablation performed by system 20, system probe 24 is assumed to comprise temperature sensor 58, which allows the processing unit to measure An actual temperature of distal end 38.)

A first step 202 is substantially the same as preprogramming step 152, wherein sets of data, corresponding to potentials to be applied to electrodes 33, are stored in memory 32. The sets of data are assumed to include a set corresponding to a sinus rhythm, a set corresponding to an AVNRT arrhythmia, and sets corresponding to different stages during ablation of an AVNRT arrhythmia.

A simulation step 204 is generally similar to simulation step 154. In step 204, the operator is assumed to select an AVNRT arrhythmia.

In a probe location step 206, the operator inserts system probe 24 into mockup patient 26. Using the location of the distal end of the system probe determined by tracking device 52 the operator positions the distal end against a desired region of surfaces 100. The operator is able to confirm correct positioning of the distal end using the output derived from the tracking devices, as well as the EP potentials measured by electrode 45. In addition, the operator reads the force exerted by the force sensor in the distal end from display 44, and adjusts the force to a desired value. If sensor 59 is in the system probe, the operator may use it to estimate a temperature of surface 100.

In an ablation simulation step 208, the operator simulates performing an ablation. Using ablation module 53, the operator sets ablation parameters such as a simulated power level to be used. The operator operates system probe 24 to simulate applying ablation to the tissue, and processor 30 measures the time of application of the simulated ablation. Using the time of application of the ablation, the force applied during the ablation, and preprogrammed parameters that have been stored in memory 32, the processor uses temperature module 59 to estimate a temperature of the tissue that is undergoing simulated ablation. The operator is able to view the temperature on display 44, and from the temperature evaluate the progress of the simulated ablation.

A real ablation procedure typically comprises multiple ablations which are performed sequentially in stages. After each stage the EP potentials generated on actual surfaces of the heart typically change. As stated above for step 202, sets of the EP potentials for the different stages are stored in memory 32.

In step 208, the processor monitors the simulated ablation that has been performed. Depending on the ablation stage that has been reached, processor 30 selects an appropriate set of EP potentials to be used by programmable signal generator 31 in generating the periodically changing potentials on electrodes 33.

In an optional monitoring step 210, the operator may decide to check that the simulated ablation performed up to any given stage is successful. In this case the operator may temporarily halt the overall simulated ablation procedure, and manipulate the distal end of the system probe so that electrode 45 contacts one or more desired regions of surfaces 100. Since processor 30, in step 208, implements the periodically changing potentials on electrodes 33 after each ablation stage, the EP potentials occurring after each ablation stage are visible to the operator on display 44.

During an actual ablation procedure there is typically a requirement to conclude the procedure as quickly as possible, so that monitoring of EP potentials after different stages of an actual ablation procedure may be difficult or impossible. However, in a simulated ablation procedure there is no such need to conclude the procedure quickly, and the ability to monitor EP potentials after different stages of the simulated procedure enhances the usefulness of system 20.

In a condition step 212, processor 30 checks if all ablation stages required for correction of the AVNRT situation have been performed in step 208. Step 212 may be initiated automatically by the processor. Alternatively step 212 may be initiated by the operator using pointing device 36 to indicate completion of the simulation.

If the condition step provides a positive return, then in a sinus step 214 the processor provides a sinus set of data to generator 31, so that electrodes 33 generate a sinus state of potentials on surfaces 100. In step 214 the operator may manipulate electrode 45 to check that mockup heart 48 is in a sinus rhythm state.

If the condition step provides a negative return, then in an error step 216 the processor may present an error notice to the operator on display 44. The error notice typically states that one or more ablation stages has been incorrectly performed, or has been missed. Typically, in step 216 the processor provides a non-sinus set of data (usually corresponding to the last ablation stage performed) to generator 31, so that electrodes 33 generate an arrhythmic state of potentials on surfaces 100, which the operator can observe using electrode 45. Typically, the operator may return to step 208 in order to correct the error.

The flowcharts described above have assumed the use of one system probe 24. Invasive medical procedures may typically use more than one actual probe, and embodiments of the present invention may also use more than one system probe, or one system probe with one or more simulated probes. Some examples using more than one probe are described below.

In the procedure illustrated by flowchart 150 (FIG. 3), in step 156 the operator may insert a first system probe 24A into heart 48, and position the first system probe to act as a reference probe. The operator may then insert a second system probe 24B and the instructions for steps 156 and 158 may be followed to map mockup heart 48.

In the procedure illustrated by flowchart 200 (FIG. 4), the situation selected in step 204 may require different types of probe, such as two types of lasso probe. First and second system lasso probes 24C and 24D may be configured in the form of the actual lasso procedure-probes, the operator may insert the first and second system probes into heart 48, and the instructions in step 206 and succeeding steps may be followed.

In some embodiments, rather than using two or more physical system probes, the operator may use one physical system probe, system probe 24, and a simulated probe that has no physical component inserted into the mockup patient. Rather, the actions of the simulated probe are simulated by processing unit 30.

For example, in the procedure illustrated by flowchart 150, in step 156 the operator may simulate insertion of a reference probe into heart 48 using pointing device 30 and display 44, so that a cursor representing the simulated probe is positioned correctly on an image of mockup heart 48. The operator may then insert physical system probe 24 and the instructions for steps 156 and 158 may be followed to map mockup heart 48. In addition, during the simulation, processing unit 30 presents outputs on display 44 corresponding to those from the simulated reference probe.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. Apparatus, comprising:
   a mockup cavity, simulating an actual body cavity of a human subject, wherein walls defining the mockup cavity comprise a tissue equivalent material (TEM);
   an array of electrodes embedded in the walls; and
   a programmable signal generator, connected to the electrodes, and configured to apply varying potentials to the array of electrodes so as to simulate electrophysiological potentials occurring in the actual body cavity as a potential generated on surfaces of the walls.

2. The apparatus according to claim 1, wherein the mockup cavity is comprised in a mockup human heart.

3. The apparatus according to claim 2, wherein the simulated electrophysiological potentials replicate sinus potentials occurring in a human heart.

4. The apparatus according to claim 2, wherein the simulated electrophysiological potentials replicate arrhythmic potentials occurring in a human heart.

5. The apparatus according to claim 2, and comprising a heart beat generator configured to cause the mockup human heart to beat.

6. The apparatus according to claim 2, and comprising a system probe configured to be inserted into the mockup human heart and to measure a characteristic of human heart activity.

7. The apparatus according to claim 6, wherein the system probe comprises a probe electrode, configured to sense the electrophysiological potentials simulated on the surfaces of the walls.

8. The apparatus according to claim 6, wherein the system probe comprises a force sensor configured to sense a force applied by a surface of the mockup human heart on the sensor.

9. The apparatus according to claim 6, wherein the system probe comprises a sensor configured to sense a temperature of a surface of the mockup human heart.

10. The apparatus according to claim 2, wherein the mockup human heart is located within a mockup human patient.

11. The apparatus according to claim 10, wherein the mockup human patient comprises surface electrodes configured to sense surface potentials in response to the simulated electrophysiological potentials.

12. The apparatus according to claim 11, wherein the surface potentials simulate electrocardiograph (ECG) signals on skin of a human patient.

13. The apparatus according to claim 10, and comprising a respiration generator configured to simulate respiration in the mockup human patient.

14. A method, comprising:
   simulating an actual body cavity of a human subject with a mockup cavity, wherein walls defining the mockup cavity comprise a tissue equivalent material (TEM);
   embedding an array of electrodes in the walls;
   connecting a programmable signal generator to the electrodes; and
   configuring the programmable signal generator to apply varying potentials to the array of electrodes so as to simulate electrophysiological potentials occurring in the actual body cavity as a potential generated on surfaces of the walls.

15. The method according to claim 14, wherein the mockup cavity is comprised in a mockup human heart.

16. The method according to claim 15, wherein the simulated electrophysiological potentials replicate sinus potentials occurring in a human heart.

17. The method according to claim 15, wherein the simulated electrophysiological potentials replicate arrhythmic potentials occurring in a human heart.

18. The method according to claim 15, and comprising causing the mockup human heart to beat.

19. The method according to claim 18, and comprising inserting a system probe, configured to measure a characteristic of human heart activity, into the mockup human heart.

20. The method according to claim 19, wherein the system probe comprises a probe electrode, configured to sense the electrophysiological potentials simulated on the surfaces of the walls.

21. The method according to claim 19, wherein the system probe comprises a force sensor configured to sense a force applied by a surface of the mockup human heart on the sensor.

22. The method according to claim 19, wherein the system probe comprises a sensor configured to sense a temperature of a surface of the mockup human heart.

23. The method according to claim 15, wherein the mockup human heart is located within a mockup human patient.

24. The method according to claim 23, wherein the mockup human patient comprises surface electrodes configured to sense surface potentials in response to the simulated electrophysiological potentials.

25. The method according to claim 24, wherein the surface potentials simulate electrocardiograph (ECG) signals on skin of a human patient.

26. The method according to claim 25, and comprising simulating respiration in the mockup human patient.

* * * * *